United States Patent [19]
Morita et al.

[11] Patent Number: 5,305,174
[45] Date of Patent: Apr. 19, 1994

[54] METHOD OF AND DEVICE FOR PROTECTING ELECTRICAL POWER SYSTEM

[75] Inventors: Masao Morita, Aichi; Toshiaki Ueda, Nagoya; Yukio Kurosawa, Hitachi; Hiroshi Arita, Mito; Tokio Yamagiwa, Hitachi, all of Japan

[73] Assignees: Hitachi, Ltd., Tokyo; Chubu Electric Power Co., Ltd., Nagoya, both of Japan

[21] Appl. No.: 753,945

[22] Filed: Sep. 3, 1991

[30] Foreign Application Priority Data

Sep. 3, 1990 [JP] Japan .................................. 2-232709

[51] Int. Cl.⁵ ............................................. H02H 3/08
[52] U.S. Cl. ............................................ 361/63; 361/9; 361/58
[58] Field of Search ................. 361/5, 9, 10, 61, 63, 361/67, 58

[56] References Cited

U.S. PATENT DOCUMENTS

| | | | |
|---|---|---|---|
| 4,214,289 | 7/1980 | Otsuka et al. | 361/58 |
| 4,351,013 | 9/1982 | Matsko et al. | 361/67 |
| 4,791,520 | 12/1988 | Stegmüller | 361/63 |
| 4,814,932 | 3/1989 | Morelli | 361/63 |

FOREIGN PATENT DOCUMENTS

| | | |
|---|---|---|
| 23277 | 2/1981 | European Pat. Off. . |
| 2090488 | 7/1982 | United Kingdom . |

*Primary Examiner*—Todd E. DeBoer
*Attorney, Agent, or Firm*—Antonelli, Terry, Stout & Kraus

[57] ABSTRACT

An electrical power system protection device includes a circuit breaker and a switch connected in series to a power line. The protection device also has a current limiting element connected in parallel to the circuit breaker. When the level of electrical current flowing in the power line, detected by a current detector, has exceeded a predetermined first set level, a first over-current detector delivers immediately a trip command to the circuit breaker. As a consequence, fault current is commutated to the current limiting element so that any drop of voltage in the power line upstream of the circuit breaker is greatly suppressed. When a state in which a predetermined second set level is exceeded by the detected current level is continued beyond a predetermined period, a second over-current detector delivers an off command to the switch, thus protecting the upstream portion of the power line against the fault in this power line. The current level is set to fall within a range which activates a momentary element of an over-current relay of a receiving end breaker of a downstream sub-system connected to the power line. In the event of a failure in the downstream power line, the receiving end breaker is tripped immediately so that the sound portion of the power line is reset to a normal state of operation.

24 Claims, 10 Drawing Sheets

METHOD OF AND DEVICE FOR PROTECTING ELECTRICAL POWER SYSTEM

BACKGROUND OF THE INVENTION

1. Field of the Invention

The present invention relates to a system for protecting an electrical power system, and more particularly, to an electrical power system protecting method and device in which, in the event of a failure in a part of electrical lines of an electrical power network or system, a suitable measure is taken for ensuring safe operation of other sound lines.

2. Description of the Related Art

In general, electrical power network is constructed to include a plurality of power transmission lines or a plurality of power distributing lines. In the event of a failure such as short-circuit fault in one of the power lines of the network, the line in which the failure has occurred is disconnected from sound power lines which are on the "upstream" side of the failed line by tripping the circuit breaker of the receiving end of the failed line.

In the case of a power distribution system, high voltage such as 77 KV is transformed into a lower distribution voltage, e.g., 6.6 KV, through one or more transformers which are provided in a distributing substation, and the power of the thus reduced voltage is distributed from a substation BUS to a plurality of feeders branching off the substation BUS. The power is then supplied to consumers through the feeders. In this type of distribution system, when a failure such as short-circuit fault has occurred in the load side of one of the feeders, the circuit breaker provided on the branching end of the feeder adjacent to the substation BUS (referred to as "feeder circuit breaker") is made to trip so as to disconnect this feeder, while ensuring supply of electrical power to other feeders which are sound, thus protecting the power distribution system. A protecting method called "harmonic protection" also has been adopted in which circuit breakers in the failed feeder which is most downstream and which is closest to the point of failure is selectively and preferentially opened to enable supply of power to wide area as possible. For instance, the timing of tripping of the feeder circuit breaker is delayed a predetermined time, e.g., 0.2 second, after tripping of the circuit breaker of the receiving end of a consumer in which the fault has occurred.

In the conventional protecting system as described, when the point at which the fault has occurred is close to the feeder circuit breaker, a large short-circuit current may flow through this feeder during the period of the delay mentioned above. As a consequence, the voltage of the power supplied to other feeders which are sound and which are connected to the same main transformer as the failed feeder may drop. Such a drop of the voltage has not been recognized as a critical problem. In recent years, however, the influence of such voltage drop is often not negligible because the short-circuit current is very large in current power network having a large capacity. In particular, in the modern information-oriented society in which abundant electronic information devices such as computers are used, a large voltage drop causes a serious situation such as erasure of the information stored in terminal devices of information systems, on-line control systems and computers, even when the period of such voltage drop is very short.

On the other hand, an increase in the level of short-circuit current attributable to increase in the capacity of electrical power network requires that mechanical durability of equipments in the network, as well as the capacities of the circuit breakers in the network, to be increased. In recent years, therefore, a current limiting device has been proposed which suppresses increase in the level of short-circuit current thereby reducing breaking capacities required for circuit breakers, as in, for example, in Report SPD-87-43 of The Institute of Electrical Engineers of Japan, Oct. 27, 1987. In this current limiting device, a current -limit fuse and a current limiting element are connected in parallel with a switching element which has a predetermined breaking capacity. In the event of a short-circuit fault, the switch element is opened first so that short-circuit current flows first through the current limiting fuse. After a while, the current limiting fuse is fused so that the short-circuit current is made to flow through the current limiting element, whereby the level of the short-circuit current is limited. This current limiting device suppresses the level of the short-circuit current so as to diminish the reduction of voltage in the sound portion of the electrical power network in the event of a fault of the kind described.

The art disclosed in the Report mentioned above, however, suffers from the following problem. Namely, the above-mentioned current limiting device, when used as a feeder circuit breaker, is not designed for performing the aforesaid harmonic protection function, i.e., selective and preferential tripping of circuit breaker which is downstream from the feeder and which is close to the point where the fault has occurred. Therefore, when the short-circuit current is limited excessively, the momentary element of an over-current relay which is to trip the circuit breaker closest to the point where the fault has occurred so not operate so that the time required for separation of the fault point is prolonged undesirably.

SUMMARY OF THE INVENTION

Accordingly, an object of the present invention is to provide a method of and a device for protecting electrical power system which, in the event of a failure in one of the power lines of the electric power system, effectively suppresses a reduction of voltage in the power lines upstream of the point where the fault has occurred and which can perform harmonic protection of the electric power system, thereby overcoming the above-described problems of the prior art.

To this end, according to one aspect of the present invention, there is provided a method of protecting a power system having at least one power line, comprising: commutating, when a fault current is detected in the power line, the current in the power line from the normal circuit of the power line to a current limiting circuit, thereby limiting the current, to a level which is higher than the minimum level of the operation current required for operating a momentary element of an over-current relay which activates a protection equipment of a downstream sub-system connected to the power line.

Preferably, the power line is disconnected if the fault is not eliminated within a predetermined period from the commutation, whereas, when the fault is eliminated within the predetermined period, the current of the power line is switched back from the current limiting circuit back to the main circuit.

According to another aspect of the present invention, there is provided a protection device for protecting an electrical power system, comprising: a main circuit including a switch and a circuit breaker connected in series to the switch, the main circuit being connected in series to a power line; a current limiting element connected in parallel with the circuit breaker; a current detector for detecting electrical current flowing in the power line; a first over-current detector for delivering to the circuit breaker a trip command immediately after the level of the electrical current detected by the current detector has exceeded a first set level; and a second over-current detector for delivering an off command to the switch when a state in which the level of electrical current exceeds a second set level has continued beyond a predetermined period. The device maybe so constructed that a close command is given to the circuit breaker when the detected current level is lowered below the second set level within the predetermined period.

In order to minimize the period of voltage drop to, for example, ¼ cycle time or shorter, the breaker is preferably made of a semiconductor switch such as a GTO thyristor.

In operation of the device having the described construction, when an over-current due to a fault such as, for example, a short-circuit is detected, the circuit breaker is interrupted in accordance with the performance curve of the OCR, whereby the fault current is commutated to the current limiting circuit or the current limiting element which is connected in parallel to the circuit breaker. As a consequence, the fault current is significantly limited by the current limiting element, whereby drop of voltage of the power lines upstream of the tripped circuit breaker is significantly limited. Thus, drop of voltage supplied to other power lines connected to the same BUS or transformer as the failed power line is remarkably suppressed to realize a highly reliable supply of the electrical power.

The level of the limited electrical current falls within the range of current for operating the momentary element of an over-current relay (OCR) provided in the receiving end circuit breaker in a sub-system downstream of the failed power line, e.g., a consumer's sub-system. Therefore, if the fault has taken place in the downstream sub-system, the receiving end circuit breaker of such a sub-system is tripped without delay, whereby the sound portion of the power line is reset to the normal state of operation, thus meeting the requirement for the harmonic protection of the power system. In the event that the fault has taken place in the power line having the protection device of the invention, the switch is opened in accordance with the timing characteristic of the second over-current relay.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the present invention will be described with reference to the accompanying drawings.

Figure 1:
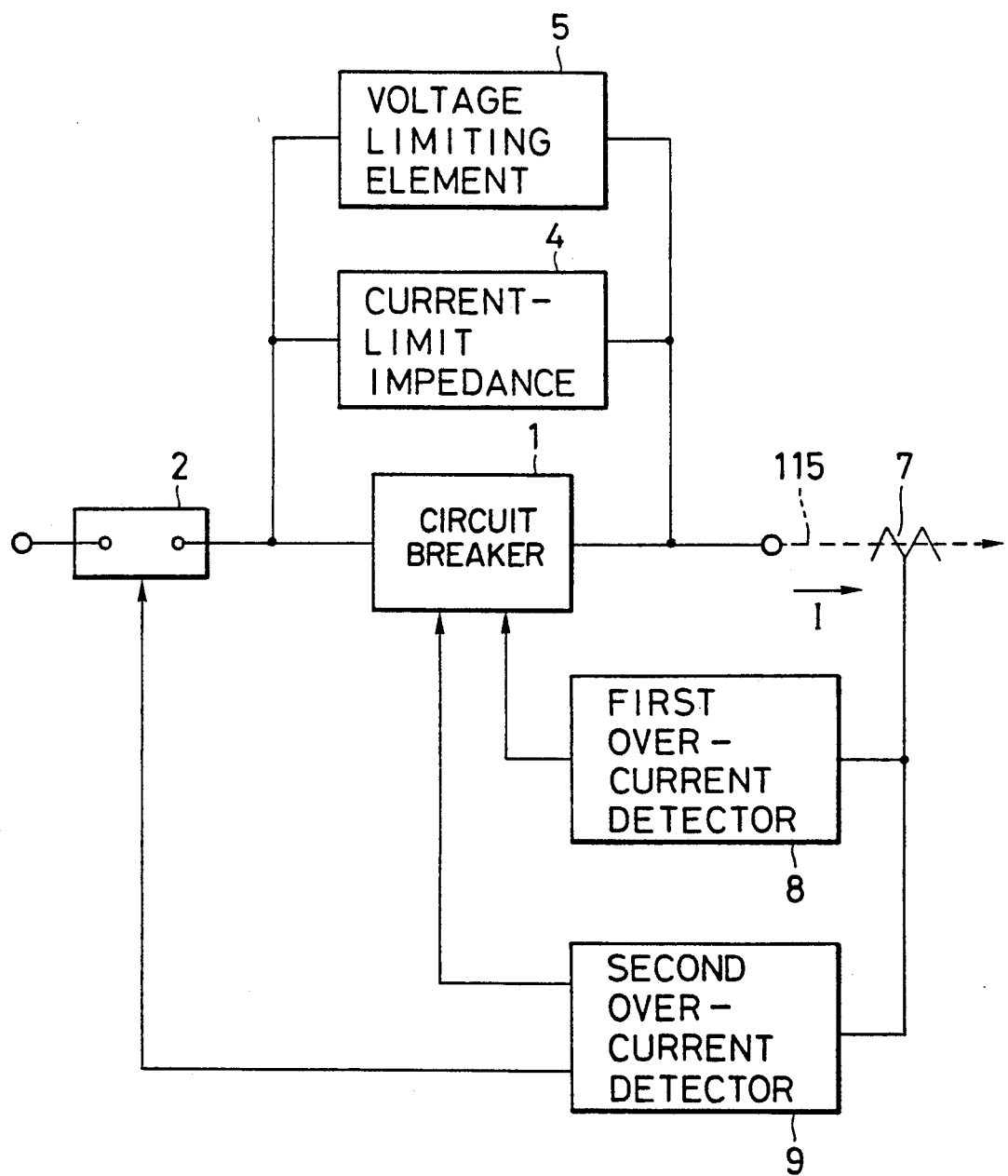
FIG. 1 is a block diagram of an embodiment of a protecting device of the invention for protecting an electrical power system.

Referring to FIG. 1 which is a block diagram of an embodiment of a protecting device of the invention for protecting an electrical power system, a main normal circuit has a series circuit including a circuit breaker 1 and a switch 2 connected in series thereto. A current limiting impedance is connected in parallel with the circuit breaker 1 so that a current limiting circuit is formed. In the illustrated embodiment, a GTO thyristor is used as the breaker 1. In order to protect the GTO thyristor from over-voltage, a voltage limiting element 5 is connected in parallel with the GTO thyristor. The voltage limiting element 5 has such a characteristic as to drastically reduce its resistance when the voltage is increased to or above a predetermined set voltage.

Figure 2:
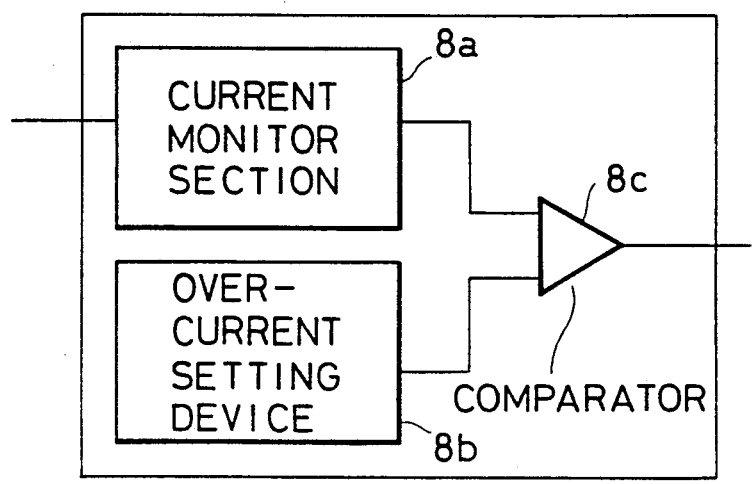
FIG. 2 is a block diagram of a first over-current detector incorporated in the embodiment shown in FIG. 1.
Figure 3:
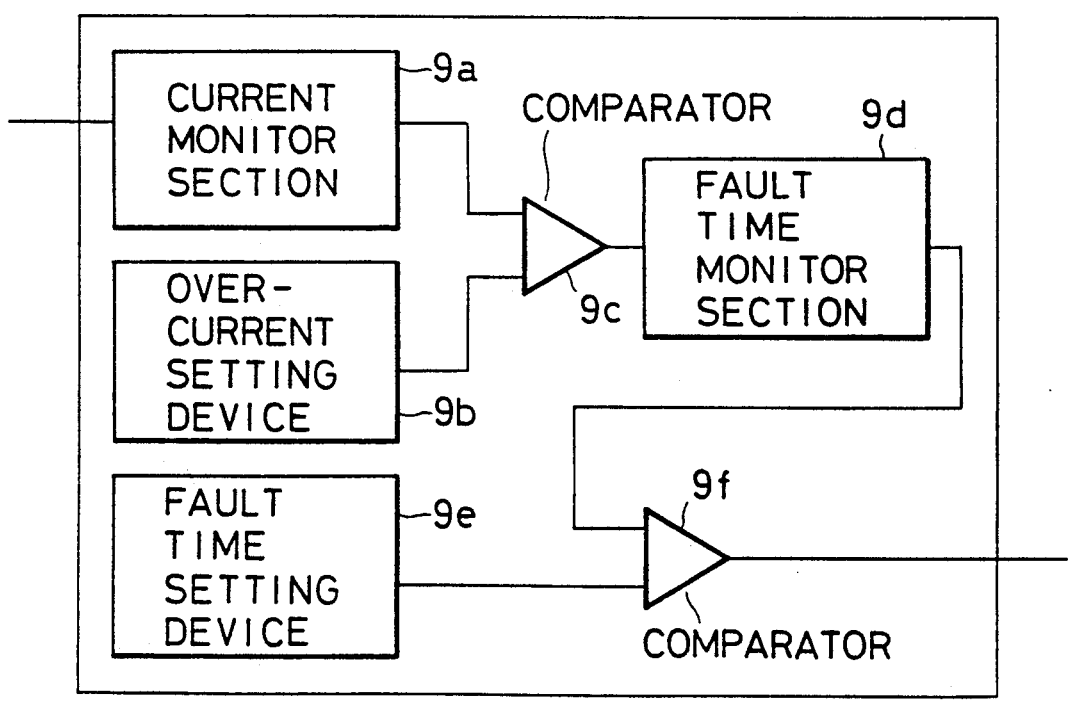
FIG. 3 is a block diagram of a second over-current detector incorporated in the embodiment shown in FIG. 1.

The load current I flowing through the main normal circuit or the current limiting circuit is detected by a current detector 7. The output from the current detector 7 is delivered to first and second over-current detectors 8 and 9. The first over-current detector 8 is adapted for delivering a trip command to the circuit breaker 1 when the load current I has exceeded a first set level $I_1$. The construction of the over-current detector 8 is shown in FIG. 2. As will be seen from this Figure, the first over-current detector 8 has a current monitor section 8a which receives the output from the current detector 7 and conducts a pre-processing such as filter processing, an over-current setting device 8b for variably setting the first set level $I_1$, and a comparator 8c which produces a signal when the set level $I_1$ is exceeded by the output of the current monitor section 8a. The second over-current detector 9 is adapted for delivering an off command to the series switch 2 when a state in which the load current I exceeds a second set level $I_2$ is maintained for a predetermined period. The construction of the second over-current detector 9 is shown in FIG. 3. As will be seen from this Figure, the second over-current detector 9 includes a current monitor section 9a for receiving the output from the current detector 7 and conducting a pre-processing such as filtering, an over-current setting device 9b for variably setting the second set level $I_2$, a comparator 9c for outputting a signal when the output of the current monitor section 9a has exceeded the level $I_2$ set by the over-current setting device 9b, a fault time monitor section 9d for measuring the duration of the signal from the comparator 9c, a fault time setting device 9e for variably setting a set fault time $T_1$, and a comparator 9f for producing a signal when the output from the fault time monitor section 9d has exceeded the set value $T_1$ of the fault time. The second over-current detector 9 is provided with a resetting function for delivering an on command to the circuit breaker 1 when the load current I has come down below the second set level $I_2$ within the above-mentioned set time $T_1$ is provided, although such a function is not illustrated. This function, however, may be provided in the first over-current detector 8. The second over-current detector 9 may be formed by, for example, an induction disk-type detector having a characteristic shown by a curve 8 in FIG. 4.

Figure 5:
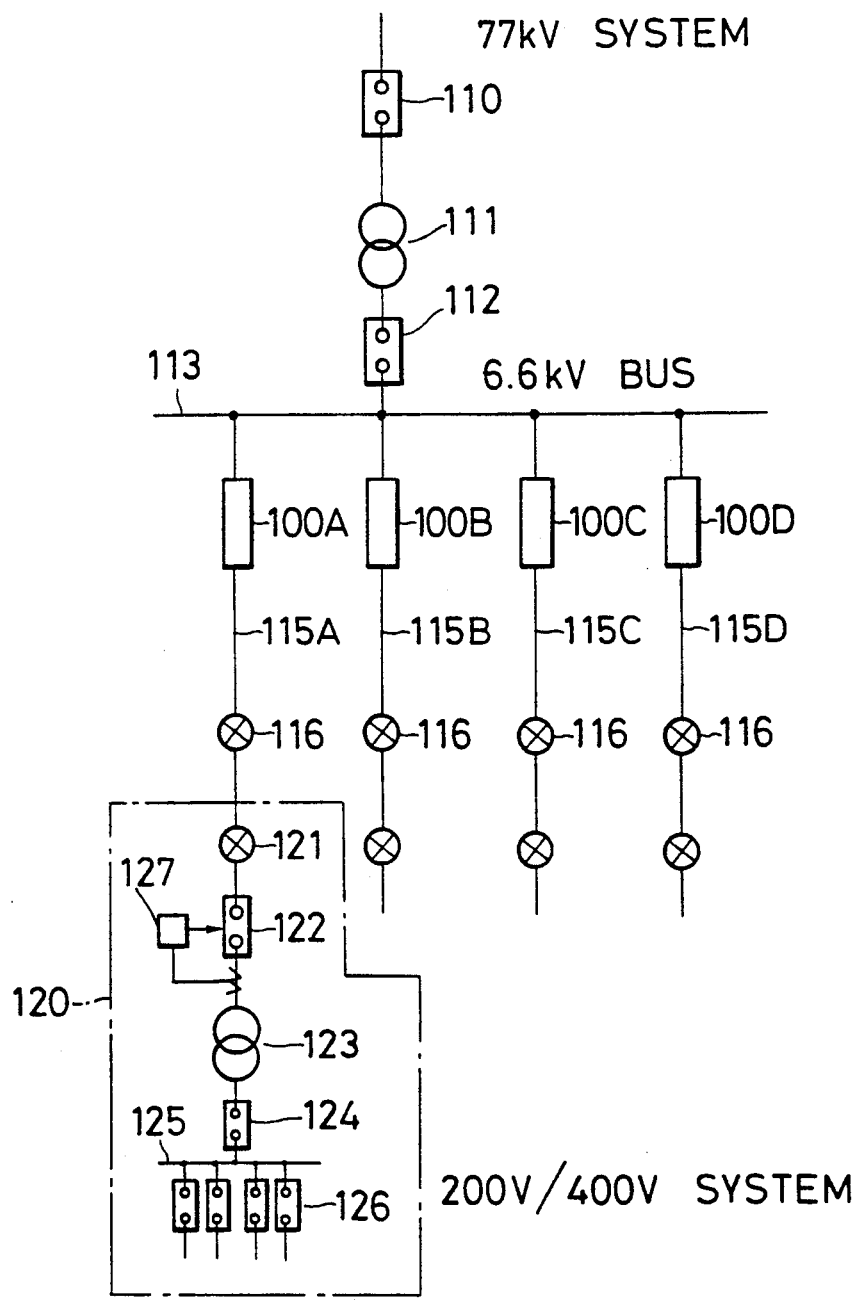
FIG. 5 is a diagram of a power distributing system incorporating a device of the present invention for protecting an electric power system.

The embodiment having the described construction is used, for example, as a feeder circuit breaker of a power distributing system shown in FIG. 5. This power distributing system, as will be seen from FIG. 5, has a transformer bank 111 which is connected to an upstream 77 kA power system through a primary circuit breaker 110, a BUS 113 connected to the transformer bank 111 through a secondary circuit breaker 112, a plurality of feeders 115A to 115D branching from the BUS 113, and consumer's sub-systems 120 connected to the respective feeders 115. The feeders 115A to 115D respectively have feeder circuit breakers 100A to 100D and section switch 116. Each sub-system 120 includes a section circuit breaker 121, a receiving end circuit breaker 122, a transformer 123, a secondary circuit breaker 124, a BUS 125 and circuit breakers 126. The receiving end circuit breaker 122 is adapted to be tripped by an over-current relay 127 for detecting fault occurring in the sub-system 120.

Figure 4:
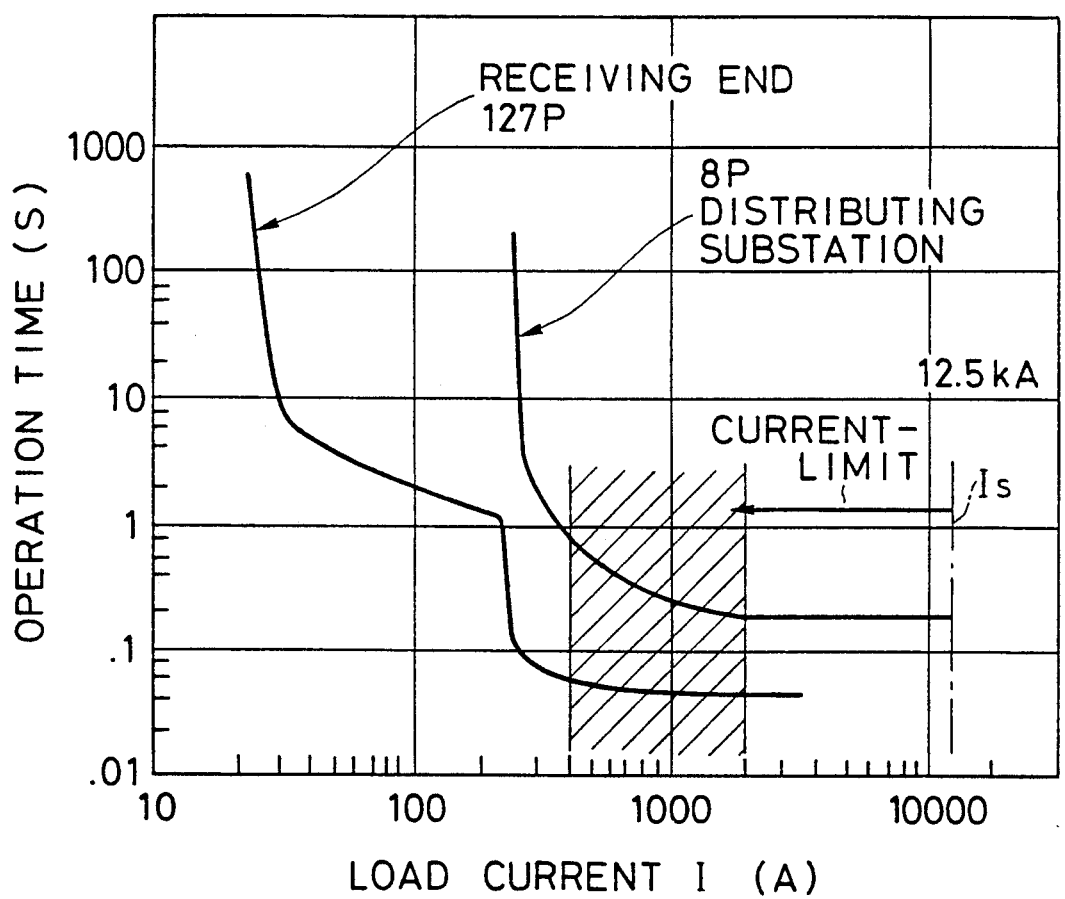
FIG. 4 is a graph showing operation characteristics of an over-current relay (OCR) explanatory of operation of the embodiment.

The operation of the protecting device of FIG. 1, applied to the power distributing system shown in FIG. 5, will be described with specific reference to FIG. 4 which shows the operation characteristic of an over-current relay(OCR) and FIG. 4 which is a time chart showing the manner in which the load current varies. It is assumed here that a fault has occurred in one of the consumers sub-systems 120 belonging to one 115A of the feeders. In such a case, a large short-circuit current $I_s$, e.g., 12.5 KVA, which is determined by factors such as the capacity of the transformer bank 111, is caused to flow into the feeder 115A through the series switch 2 and the circuit breaker 1. This short-circuit current Is activates the over-current detector 8, so that the circuit breaker 1 is made to interrupt immediately, e.g., within half cycle period in the case of the GTO thyristor, so that the short-circuit current $I_s$ is commutated to flow through the line having the current limiting impedance 4. The level of the current flowing through this line is varied by the value of the impedance 4. The impedance value is determined, taking into account also the capacity of the main transformer, to the greatest value which does not cause the voltage supplied to other sound feeders to be lowered to an unacceptable level. In the embodiment shown in FIG. 4, the impedance is determined to be, for example, 2 K Arms. The impedance value of the time limiting impedance 4 also is determined such that the current is not lowered below the minimum value of the operation current range for the momentary element of the over-current relay 127 whose operation characteristic is shown by a curve 127P in FIG. 4, in order to ensure that the consumers receiving end circuit breaker 122 is tripped preferentially. In the embodiment shown in FIG. 4, this minimum value of the operation current range for the momentary element of the over-current relay 127 is 400 Arms. It is assumed here that the time limiting characteristic of the second over-current detector 9 is set in accordance with the characteristic curve 8P shown in FIG. 4. In such a case, the series switch 2 is opened after elapse of a predetermined time in accordance with the time limiting characteristic of the over-current detector 9, whereby the feeder 115A having the fault is disconnected. When the momentary element of the consumer's receiving end over-current relay (OCR) operates before the elapse of the above-mentioned time, the receiving end circuit breaker 122 trips to extinguish the short-circuit current $I_s$, so that the circuit breaker 1 is reset to allow the power supply to be continued to the sound consumers sub-systems other than the failed sub-system.

Figure 6:
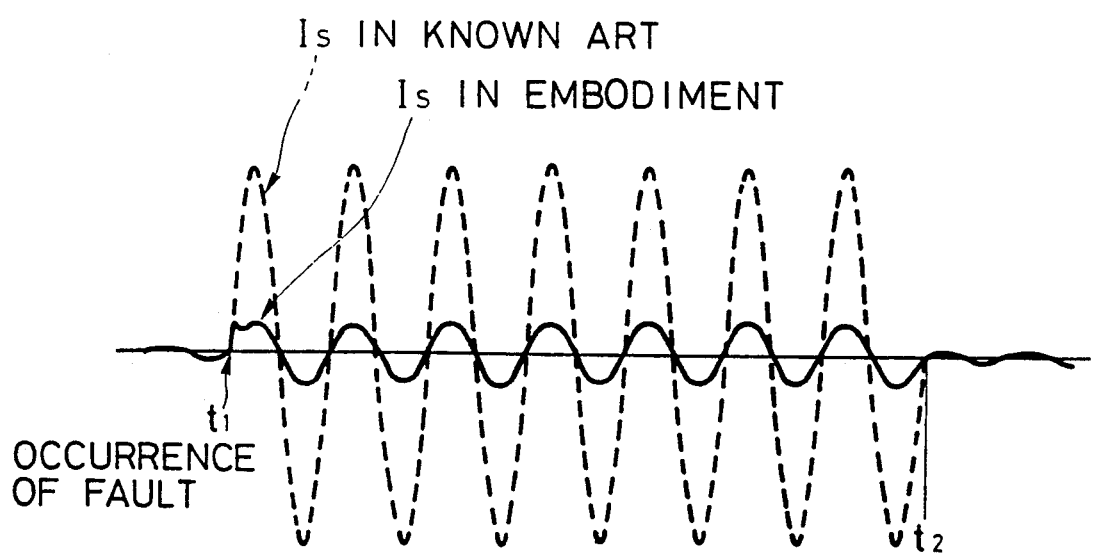
FIG. 6 is a time chart illustrative of the manner in which the level of a short-circuit current varies in the embodiment shown in FIG. 1, in comparison with that in conventional device.

As a consequence, the short-circuit current $I_s$ varies in a manner shown by solid-line curve in FIG. 6, which should be contrasted to the manner of change of short-circuit current in conventional system shown by broken line in the same Figure. As will be seen from this Figure, in the conventional system, a large short-circuit current flows for several cycles between the moment $t_1$ at which the fault has occurred and the moment $t_2$ at which the receiving end over-current relay (OCR) operates, whereas, in the system employing the protecting device of the invention, the current limiting function is put into effect within the period of as half cycle of the current, thereby remarkably suppressing the level of the short-circuit current.

As will be understood from the foregoing description, the described embodiment offers the following advantages.

First of all, it is to be pointed out that the drop of voltage applied to the feeders 115 connected to the same transformer bank 111 is remarkably decreased. In particular, a very short tripping time is attained by virtue of use of a GTO thyristor as the circuit breaker 1. In fact, it is possible to limit the fault current within a very short time of 1 ms or so. It is therefore possible to remarkably shorten the duration of the voltage drop in the power-distributing substation, whereby undesirable effects on sound consumer's substations can be greatly suppressed. In contrast, when a known circuit breaker is used, a large short-circuit current of 12.5 KA or so flows over the period of several cycles as shown in FIG. 6, causing a risk that the drop of the voltage supplied to other feeders 115B to 115D connected to the same transformer 111 is continued for a considerably long time.

Another advantage offered by the described embodiment is that thermal and mechanical stresses in the conductors and load equipments can be reduced. More specifically, in the power distributing system having the conventional protection device, the conductors and the load equipments are required to undergo a stress produced by large short-circuit current of 12.5 KA for a period of 0.2 second, whereas, in the system having the protection device of the present invention, the conductors and equipments are required only to withstand a stress corresponding to 2 KA for the same period. Furthermore, damage produced by an arc generated in the feeder having the fault is diminished.

The level of the current after the limitation falls within the range which enables operation of the momentary element of the receiving end over-current relay (OCR) provided in the consumer's receiving end circuit breaker 122 which is downstream from the failed feeder 115A. Therefore, the receiving end circuit breaker 122 is tripped without delay when the accident has occurred in this consumer's sub-system. On the other hand, the feeder which is sound is reset to normal state of operation, thus satisfying the requirement for the harmonic protection of the power system. In the event that the fault has occurred in the feeder 115A itself, the switch 2 is opened in accordance with the time-limit characteristic of the second over-current detector 9, while other sound feeders are reset to the normal state of operation.

According to the invention, it is possible to reduce the breaking capacity of the receiving end circuit breaker 122, by virtue of the above-described current limiting function. More specifically, the breaking capacity of the receiving end circuit breaker 122 is as small as 2 KA in the system incorporating the described embodiment, whereas, in the system having the conventional protection device, the receiving end circuit breaker 122 is required to have a braking capacity which is as large as 12.5 KA.

Although the described embodiment employs a GTO thyristor as the circuit breaker 1, this is only illustrative and the circuit breaker 1 may be constituted by other types of circuit breakers such as, for example, semiconductor switches incorporating a thyristor switch having a commutating function or an electrostatic induction thyristor, as well as ordinary circuit breakers and vacuum circuit breakers. It is also possible to use a switch made from a superconducting material as the breaker 1 in the protecting device of the present invention.

In the use of the device shown in FIG. 1, it is preferred that the series switch 2 is close first, followed by closing of the circuit breaker 1. This manner of operation effectively prevents any rush current from flowing through the series switch 2 because, when the series switch is closed, the current limiting impedance already has been put into the circuit, whereby application of an over-voltage to the circuit breaker 1 is interrupted. A higher reliability is obtained when a semiconductor switch is used as the circuit breaker 1.

Figure 7:
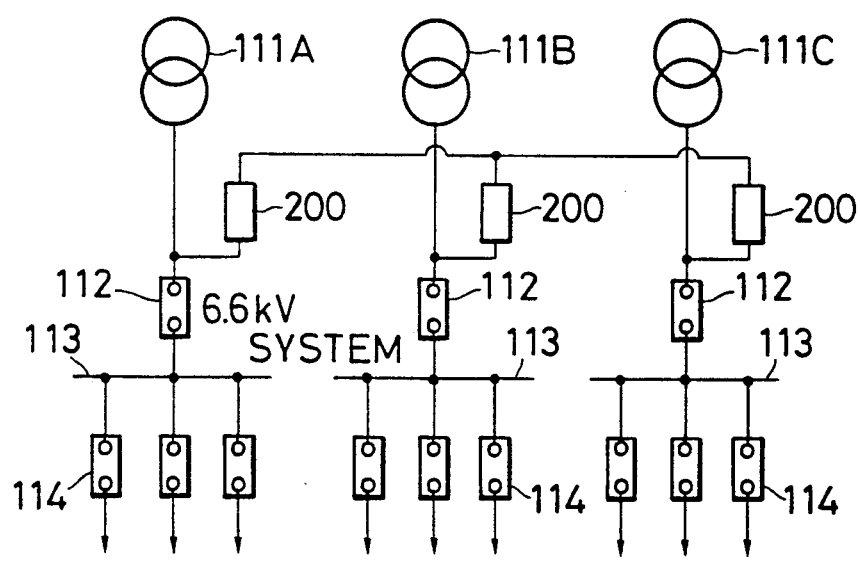
FIGS. 7, 8 and 9 are block diagrams of power distributing systems, illustrating examples of application of the protecting device in accordance with the present invention.
Figure 8:
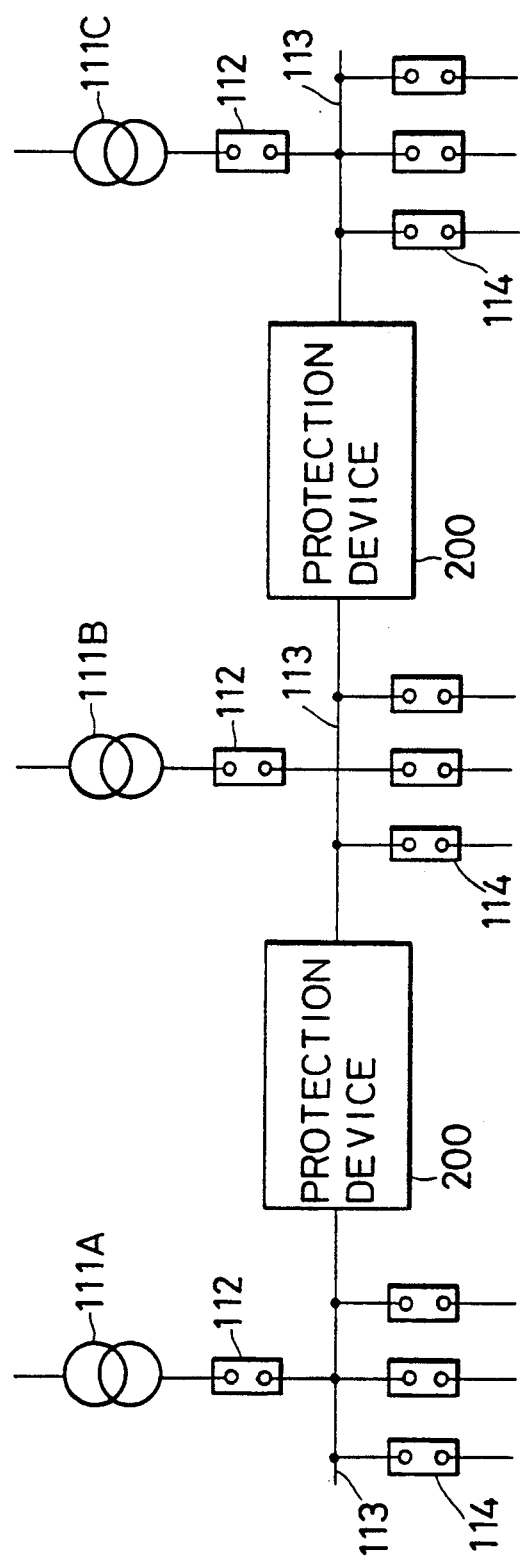
Figure 9:
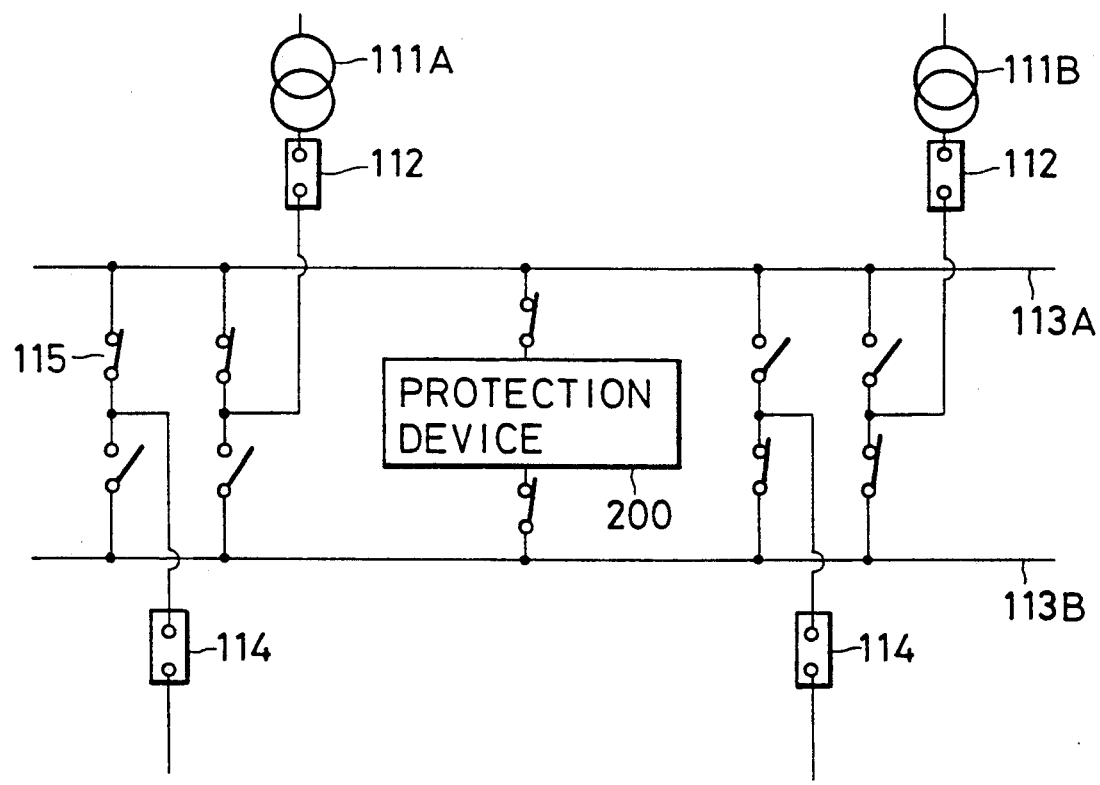

FIG. 7 illustrates a system in which the protection device of the type shown in FIG. 1 is used for the purpose of improving the rate of use of transformers in a power distributing substation. More specifically, in the system shown in FIG. 7, a plurality of independent transformer banks 111A, 111B, 111C are connected at their secondary side (6.6 KV) through protection devices 200 each having the construction as shown in FIG. 1. According to this arrangement, when a short-circuit failure has occurred in the BUS 113 of the secondary circuit breaker 112 of a transformer or in a portion of the load side of the feeder circuit breaker 114, the protection device 200 trips to limit the short-circuit current, thereby diminishing any influence on other transformers which operate in parallel with the transformer of the failed system. As a consequence, reduction in the voltage of the BUS in the power distributing substation can be remarkably suppressed. As an alternative measure shown in FIG. 8 the protection devices 200 may be connected in the lines which interconnect the BUSes 113. It is also possible, as shown in FIG. 9, to insert the protection device 200 in the line which interconnects BUSes 113A and 113B.

Figure 10:
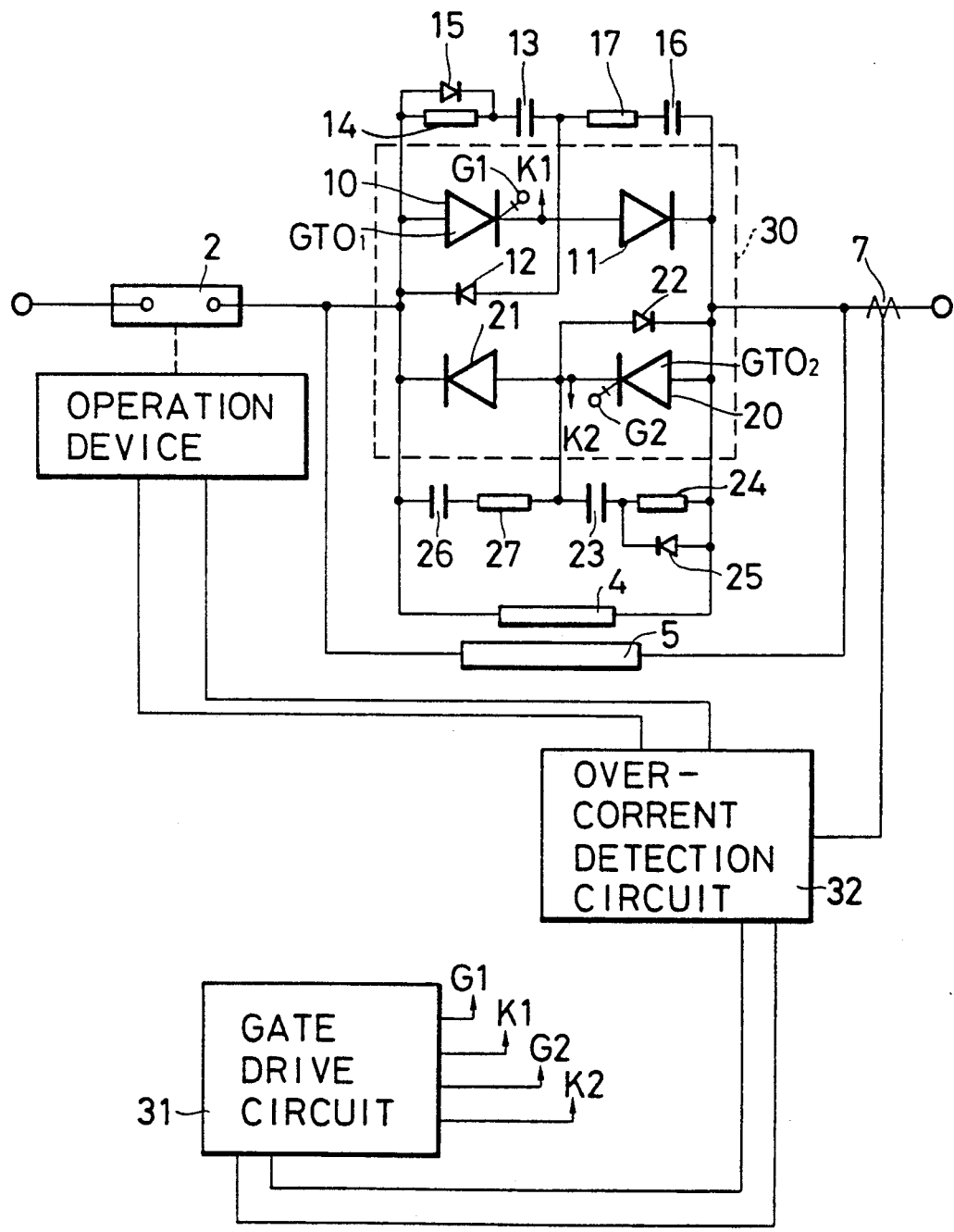
FIGS. 10 and 11 are illustrations of a circuit breaker in accordance with the present invention and a modification of the circuit breaker, respectively.

A practical example of the circuit breaker 1 shown in FIG. 1, employing a GTO thyristor, will be described with reference to FIG. 10. The circuit breaker 1 has a main breaking portion composed of inverse parallel circuits of GTO thyristors, employing a GTO 10 and a GTO 20. In general, a GTO thyristor has a small backward dielectric strength. Therefore, series diodes 11, 21 and inverse parallel diodes 12, 22 are connected to each GTO. In addition, a snubber circuit, which has a capacitor 13, a resistor 14 connected in series to the capacitor 13 and a diode 15 connected in parallel with the resistor 14, is connected to the GTO thyristor $GTO_1$. Similarly, a snubber circuit, which has a capacitor 23, a resistor 24 connected in series to the capacitor 23 and a diode 25 connected in parallel with the resistor 24, is connected to the GTO thyristor $GTO_2$. In order to prevent over-voltages from being established across the diodes 11 and 21, snubber circuits which respectively include a series connection of a capacitor 16 and a resistor 17 and a series connection of a capacitor 26 and a resistor 27 are connected in parallel with the diodes 11 and 12. An example of the practical construction of the circuit breaker 1 has been described. The portion of this circuit breaker 1 shown in the area demarcated by broken line 30 is installed in a hermetic tank as a GTO stack container and is immersed in an incombustible cooling liquid for self-cooling, in order to prevent overheating of the semiconductor elements which may otherwise be caused by high temperature established in the circuit breaker during conduction of the load current, thereby ensuring safe functioning of the semiconductor elements. In order to protect the main breaking portion against any over-voltage, as current limiting device 5 and a current limiting impedance 4 of a low resistance are connected in parallel with the main breaking portion, as explained before in connection with FIG. 1. A control circuit system associated with the circuit breaker 1 includes a gate drive circuit 31 for controlling the turn-on and turn-off operations of the GTO thyristors, and an over-current detection circuit 32 including the current detector 7 for detecting the level of the load current and adapted for detecting over-current while transmitting a signal for the gate drive. This over-current detection circuit 32 has functions of both the first over-current detector 8 and the second over-current detector 9 which were described before in connection with FIG. 1.

Figure 11:
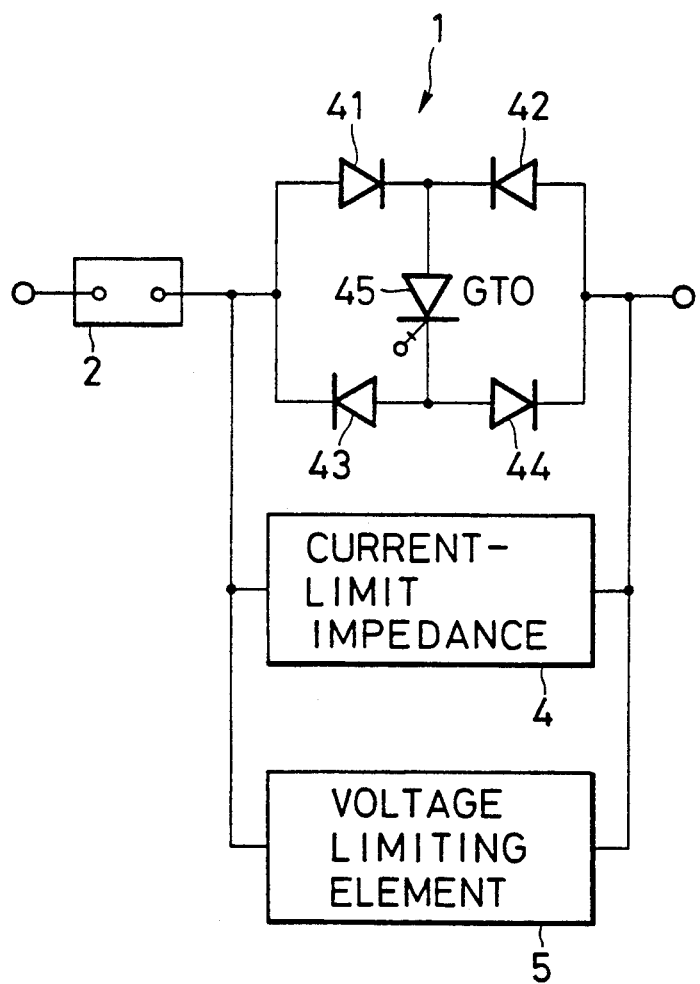

FIG. 11 shows another example of the construction of the circuit breaker 1. In this modification, diodes 41, 42, 43 and 44 are connected to form a bridge and a GTO thyristor 45 is connected between the junction of the diodes 41 and 42 and the junction of the diodes 43 and 44. This embodiment employs only one GTO thyristor which is rather expensive, so that the cost is reduced as compared with the circuit shown in FIG. 10.

Although the invention has been described through its preferred forms, it is to be understood that the described embodiments are only illustrative and various changes and modifications may be imparted thereto without departing from the scope of the present invention which is limited solely by the appended claims.

What is claimed is:

1. A method of protecting a power system having a plurality of power lines, comprising: commutating, when a fault current is detected in a power line, the current in said power line from a normal circuit of said power line to a current limiting circuit, thereby limiting said current, to a level which is higher than a minimum level of an operation current required for operating a momentary element of an over-current relay which activates a protection equipment of a downstream subsystem connected to said power line.

2. A method of protecting a power system having a plurality of power lines, comprising: commutating, when a fault current is detected in a power line, the current in said power line from a normal circuit of said power line to a current limiting circuit, thereby limiting said current; and disconnecting said power line from said power system; said current limiting circuit having a current limiting element which is set such that the level of the limited current is higher than a minimum level of an operation current required for operating a momentary element of an over-current relay which activates a protection equipment of a downstream sub-system connected to said power line.

3. A method of protecting power system having a plurality of power lines, comprising: commutating, when a fault current is detected in a power line, the current in said power line from a normal circuit including a semiconductor circuit breaker of said power line to a current limiting circuit, thereby limiting said current; and switching the current from said current limiting circuit back to said normal circuit when a fault which has caused said fault current is extinguished within a predetermined time after the commutation, while causing said power line to be disconnected when said fault has not been extinguished within said predetermined time.

4. A method of protecting a power system according to claim 3, wherein said current limiting circuit has a current limiting element which is set such that the level of the limited current is higher than the minimum level of the operation current required for operating a momentary element of an over-current relay which activates a protection equipment of a downstream sub-system connected to said power line.

5. A protection device for protecting an electrical power system, comprising: a main circuit including a switch and a; circuit breaker connected in series to said switch, said main circuit being connected in series to a power line; a current limiting element connected in parallel with said; circuit breaker; a current detector for detecting electrical current flowing in said power line; a first over-current detector for delivering to said circuit breaker a trip command immediately delay after the level of the electrical current detected by said current detector has exceeded a first set level; and a second over-current detector for delivering an off command to said switch when a state in which said level of electrical current exceeds a second set level has continued beyond a predetermined period.

6. A protection device for an electrical power system according to claim 5, wherein said current limiting element is set such that the level of the current limited by said current limiting element falls within a range of operation current for operating a momentary element of an over-current relay for activating a protection device of a downstream power sub-system connected to said power line.

7. A protection device for an electrical power system according to claim 5, wherein said circuit breaker is a semiconductor switch.

8. A protection device for an electrical power system according to claim 5, wherein said second over-current detector includes an over-current relay having a timing element which operates at said second level of electrical current after a delay at least by said predetermined period.

9. A protection device for an electrical power system according to claim 5, wherein said second over-current detector includes a comparator means for comparing the detected level of electrical current with said second set level and producing a signal when said second set level is exceeded by the detected level of electrical current, and a delay means for delivering said off command to said switch when said signal from said comparator means has lasted for said predetermined period.

10. A protection device for protecting an electrical power system, comprising: a main circuit including a switch and a; circuit breaker connected in series to said switch, said main circuit being connected in series to a power line; a current limiting element connected in parallel with said; circuit breaker; a current detector for detecting electrical current flowing in said power line; a first over-current detector for delivering to said circuit breaker a trip command immediately after the level of the electrical current detected by said current detector has exceeded a first set level; a second over-current detector for delivering an off command to said switch when a state in which said level of electrical current exceeds a second set level has continued beyond a predetermined period; and means for delivering a close command to said; circuit breaker when the detected level of the current has fallen down below said second set level within said predetermined period.

11. A protection device for an electrical power system according to claim 10, wherein said current limiting element is set such that the level of the current limited by said current limiting element falls within a range of operation current for operating a momentary element of an over-current relay for activating a protection device of a downstream power sub-system connected to said power line.

12. A protection device for an electrical power system according to claim 10, wherein said circuit breaker is a semiconductor switch.

13. A protection device for an electrical power system according to claim 10, wherein said second over-current detector includes an over-current relay having a timing element which operates at said second level of electrical current after a delay at least by said predetermined period.

14. A protection device for an electrical power system according to claim 10, wherein said second over-current detector includes a comparator means for comparing the detected level of electrical current with said second set level and producing a signal when said second set level is exceeded by the detected level of electrical current, and a delay means for delivering said off command to said switch when said signal from said comparator means has lasted for said predetermined period.

15. A method of using a protection device having a; main circuit including a switch and a circuit breaker connected in series to said switch, said main circuit being connected in series to a power line; a current limiting element connected in parallel with said; circuit breaker; a current detector for detecting electrical current flowing in said power line; a first over-current detector for delivering to said; circuit breaker a trip command immediately after the level of the electrical current detected by said current detector has exceeded a first set level; and a second over-current detector for delivering an off command to said switch when a state in which said level of electrical current exceeds a second set level has continued beyond a predetermined period, said; method comprising: closing said circuit breaker after closing of said switch.

16. A method of using a protection device having a main circuit including a switch and a; circuit breaker connected in series to said switch, said main circuit being connected in series to a power line; a current limiting element connected in parallel with said; circuit breaker; a current detector for detecting electrical current flowing in said power line; a first over-current detector for delivering to said; circuit breaker a trip command immediately after the level of the electrical current detected by said current detector has exceeded a first set level; a second over-current detector for delivering an off command to said; switch when a state in which said level of electrical current exceeds a second set level has continued beyond a predetermined period; and means for delivering a close command to said circuit breaker when the detected level of the current has fallen down below said second set level within said predetermined period, said method comprising: closing said circuit breaker after closing of said switch.

17. A protection system for a power distributing subsystem having a plurality of main transformer banks, wherein the improvement comprises that secondary lines of said main transformer banks are connected through protection devices, each of said protection devices includes a main circuit including a switch and a; circuit breaker connected in series to said switch, said main circuit being connected in series to a power line, a current limiting element connected in parallel with said; circuit breaker; a current detector for detecting electrical current flowing in said power line; a first over-current detector for delivering to said; circuit breaker a trip command immediately after the level of the electrical current detected by said current detector has exceeded a first set level; and a second over-current detector for delivering an off command to said switch when a state in which said level of electrical current exceeds a second set level has continued beyond a predetermined period, said method comprising: closing said; circuit breaker after closing of said switch.

18. A protection system for a power distributing subsystem having a plurality of main transformer banks, wherein the improvement comprises that secondary lines of said main transformer banks are connected through protection devices, each of said protection devices includes a main circuit including a switch and a; circuit breaker connected in series to said switch, said main circuit being connected in series to a power line; a current limiting element connected in parallel with said; circuit breaker; a current detector for detecting electrical current flowing in said power line; a first over-current detector for delivering to said; circuit breaker a trip command immediately after the level of the electrical current detected by said current detector has exceeded a first set level; a second over-current detector for delivering an off command to said switch when a state in which said level of electrical current exceeds a second set level has continued beyond a predetermined period; and means for delivering a close command to said circuit breaker when the detected level of the current has fallen down below said second set level within said; predetermined period.

19. A protection device for protecting an electrical power distribution system having a plurality of power lines connected to a secondary line of a transformer via a common bus, comprising:

a main circuit including a switch and a circuit breaker connected in series to said switch, said main circuit being connected in series to at least one of said power lines;

a current limiting impedance connected in parallel with said circuit breaker;

a current detector for detecting a current flowing in said power line;

a first over-current detector for delivering to said circuit breaker a trip command immediately when a level of said current detected by said current detector has exceeded a first set level;

a second over-current detector for delivering an open command to said switch when a state in which said level of the current detected by said current detector exceeds a second set level has continued beyond a predetermined period;

wherein said circuit breaker includes a plurality of semiconductor switches and a voltage limiting element connected in parallel thereto for protecting said semiconductor switches from damage by over-voltage, and an impedance value of said current limiting impedance is set such that a level of a fault current in said power line limited by said current limiting impedance is higher than a level of current which allows an operation of a momentary element of an over-current relay for tripping a circuit breaker provided in a downstream power line connected to said power line.

20. A protection device for protecting an electrical power distribution system according to claim 19, further comprising:

means for delivering a close command to said circuit breaker when said level of the current detected by said current detector has fallen below said second set level within said predetermined period.

21. A method of using a protection device for protecting an electrical power distribution system having a plurality of power lines connected to a secondary line of a transformer via a common bus, said protection device including:

a main circuit including a switch and a circuit breaker connected in series to said switch, said main circuit being connected in series to at least one of said power lines;

a current limiting impedance connected in parallel with said circuit breaker, a current detector for detecting a current flowing in said power line;

a first over-current detector for delivering to said circuit breaker a trip command immediately when a level of said current detected by said current detector has exceeded a first set level;

and a second over-current detector for delivering an open command to said switch when a state in which said level of the current detected by said current detector exceeds a second set level has continued beyond a predetermined period;

wherein said circuit breaker comprises a plurality of semiconductor switches and a voltage limiting element connected in parallel thereto for protecting said semiconductor switches from damage by over-voltage, and an impedance value of said current limiting impedance is set such that a level of a fault current in said power line limited by said current limiting impedance is higher than a level of current which allows an operation of a momentary element of an over-current relay for tripping a circuit breaker provided in a downstream power line connected to said power line; said method comprising:

closing said circuit breaker after closing said switch for activating said power line.

22. A method of using a protection device for protecting an electrical power distribution system according to claim 21, further comprising:

means for delivering a close command to said circuit breaker when said level of the current detected by said current detector has fallen below said second set level within said predetermined period.

23. A protection system for a power distributing subsystem of the type having a plurality of main transformer banks, wherein a plurality of secondary lines of said main transformer banks are connected through power lines, each of said power lines including a protection device comprising:

a main circuit including a switch and a circuit breaker connected in series to said switch, said main circuit being connected in series to each of said power lines;

a current limiting impedance connected in parallel with said circuit breaker;

a current detector for detecting a current flowing in said each of the power lines;

a first over-current detector for delivering to said circuit breaker a trip command immediately when a level of said current detected by said current detector has exceeded a first set level; and second over-current detector for delivering an open command to said switch when a state in which said level of the current detected by said current detector exceeds a second set level has continued beyond a predetermined period; wherein said circuit breaker includes a plurality of semiconductor switches and a voltage limiting element connected in parallel thereto for protecting said semiconductor switches from damage by over-voltage, and an impedance value of said current limiting impedance is set such that a level of a fault current in said power line limited by said current limiting impedance is higher than a level of current which allows an operation of a momentary element of an over-current relay for tripping a circuit breaker provided in a downstream power line connected to said power line.

24. A protection system for a power distributing subsystem according to claim 23; further comprising:

means for delivering a close command to said circuit breaker when said level of the current detected by said current detector has fallen down below said second set level within said predetermined period.

* * * * *